United States Patent

Stocker

[15] 3,645,307
[45] Feb. 29, 1972

[54] POWER SAW GUIDE

[72] Inventor: Henry C. Stocker, Surrey, British Columbia, Canada

[73] Assignee: Protrack Industries Ltd., White Rock, British Columbia, Canada

[22] Filed: June 10, 1970

[21] Appl. No.: 44,940

[52] U.S. Cl. .............................143/6 G, 143/47 D, 143/47 F
[51] Int. Cl. ..............................................................B27b 5/20
[58] Field of Search.....................143/6 G, 6 J, 6, 47, 47 F, 143/47 D

[56] References Cited

UNITED STATES PATENTS

| | | | |
|---|---|---|---|
| 1,841,032 | 1/1932 | Hutchinson | 143/47 F X |
| 2,789,594 | 4/1957 | Coleman | 143/6 G X |
| 3,045,724 | 7/1962 | Mitchell | 143/6 G |
| 3,344,824 | 10/1967 | Greco | 143/6 G |

*Primary Examiner*—Donald R. Schran
*Attorney*—Lyle G. Trorey

[57] ABSTRACT

A power saw guide including a base frame adapted to be secured to a worktable, the frame having a guide rail adapted for adjustment about a vertical axis. A saw carriage is roller supported on the rail for longitudinal movement, a guide roller on the carriage being adjustable to permit the carriage to be levelled relative to the worktable.

6 Claims, 6 Drawing Figures

PATENTED FEB 29 1972
3,645,307
SHEET 3 OF 3
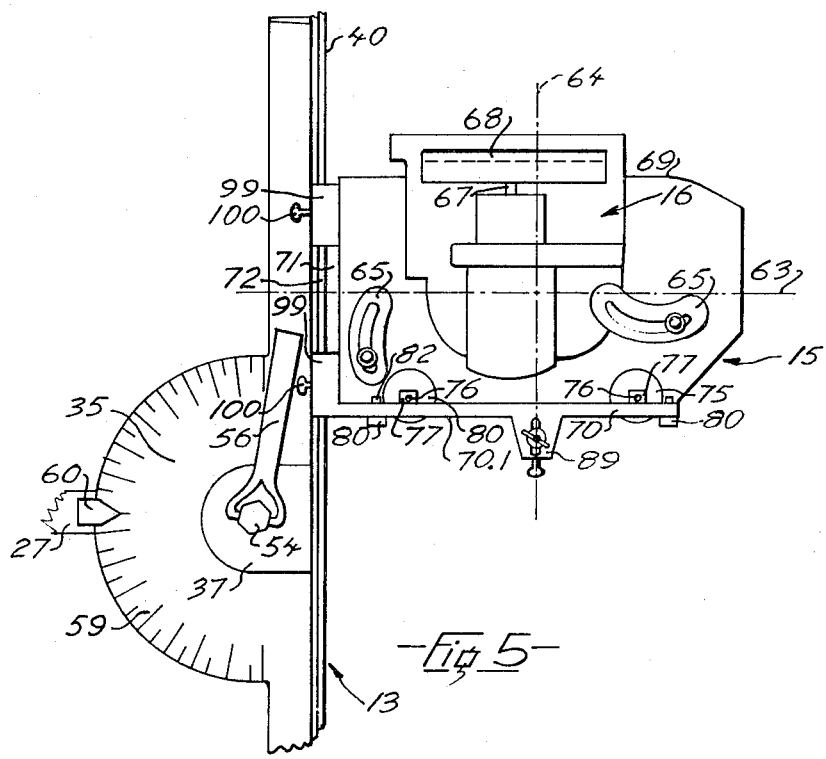
—Fig.5—
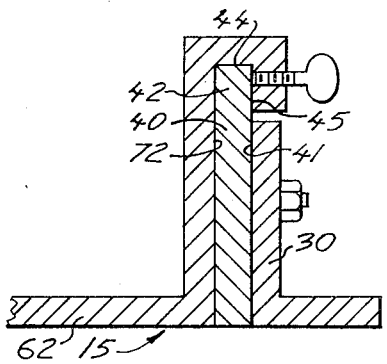
—Fig.6—
Henry C. Stocker,
Inventor
by *Trorey*
Lyle G. Trorey,
Agent

3,645,307

POWER SAW GUIDE

BACKGROUND OF THE INVENTION

1. Field of the Invention

This invention relates to saw guides for portable power saws.

2. Prior Art

Portable power saw guides generally include a base frame which can be clamped to a worktable and a guide rail along which a saw carriage is adapted to be moved mounted on the base frame. Means are provided for adjusting the guide rail for crosscutting wood stock at a desired angle.

In most saw guides of prior art the carriage usually slides on the rail and, consequently, can jam from sawdust becoming lodged between sliding parts. Due to sliding contact of the carriage and guide rail the sliding parts wear to an extend which can impair cutting accuracy.

SUMMARY OF THE INVENTION

The present invention provides a readily portable saw guide which is easy to set up so as to be amenable for field operations and which provides for a portable hand power saw to be used for crosscutting.

In the saw guide of the present invention a saw-carrying carriage is supported on a guide rail so as to substantially eliminate wear.

The saw guide of the present invention includes a base frame adapted to be clamped to a worktable, the frame having a guide rail adjustable about a vertical axis, a saw carriage having supporting and guide rollers engaging the guide rail, one of the guide rollers being adjustable so as to enable the carriage to be levelled relative to the worktable.

Means are provided on the carriage for releasably securing the carriage against movement relative to the guide rail so that a saw carried by the carriage can be used in the ripping operation.

DESCRIPTION OF THE DRAWINGS

FIG. 5 is a plan of a portion of the saw guide with the carriage setup for ripping, FIG. 6 is a detail section on 6—6 of FIG. 5.

A detail description following, related to drawings, gives exemplification of embodiment of the invention which, however, is capable of expression in structure other than that particularly described and illustrated.

DETAILED DESCRIPTION

FIG. 1

Figure 1:
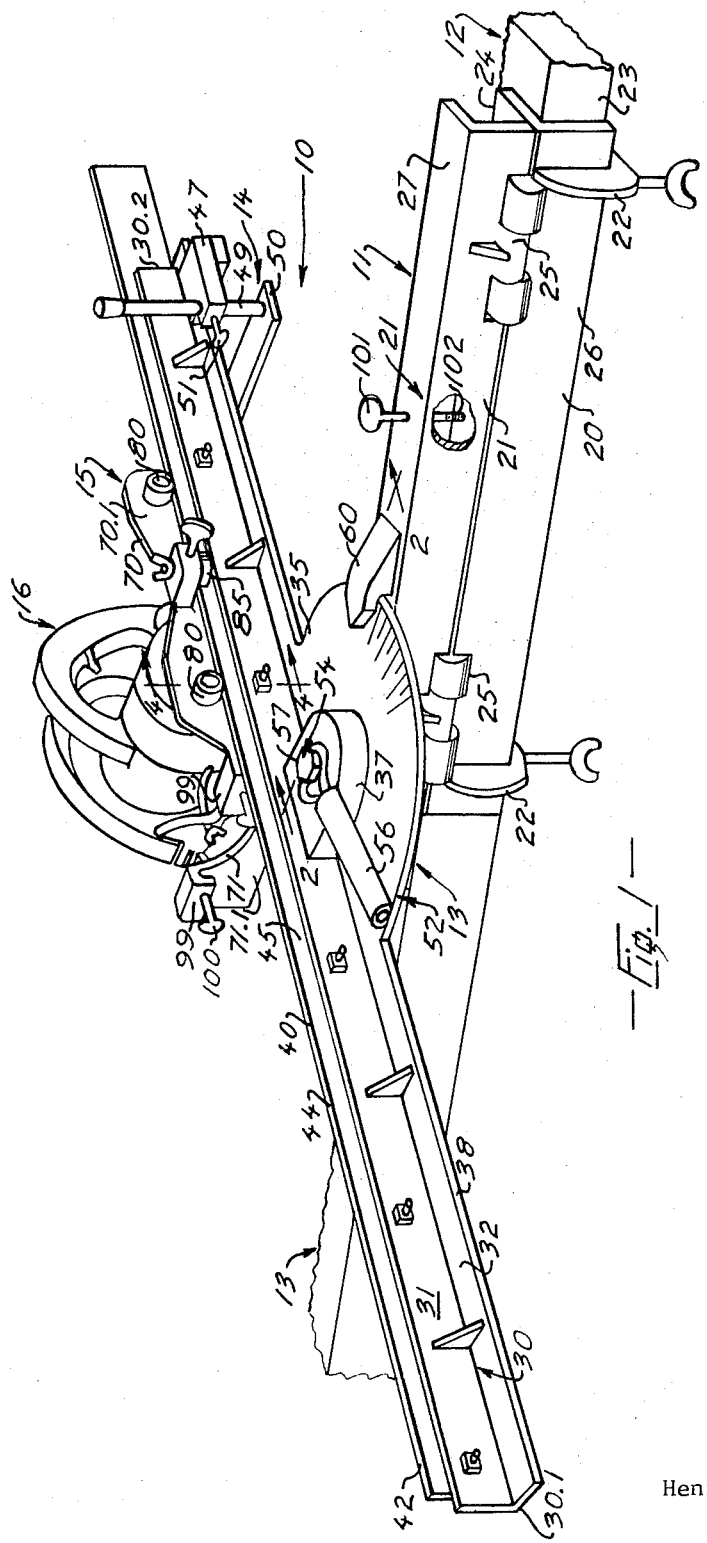
FIG. 1 is a perspective of a saw guide according to the invention, shown secured to a worktable with a portable power saw mounted on a carriage set up for crosscutting.

As seen in FIG. 1 a saw guide, generally 10, includes a base frame 11 clamped to a worktable 12. A guide rail assembly 13 is mounted on the base frame for pivotal adjustment about a vertical axis, the guide rail extending parallel to but spaced above the worktable and supported by an adjusting foot assembly 14. A carriage 15 carrying an electrically powered portable circular saw 16 is mounted on the guide rail for longitudinal movement along the rail.

Figure 2:
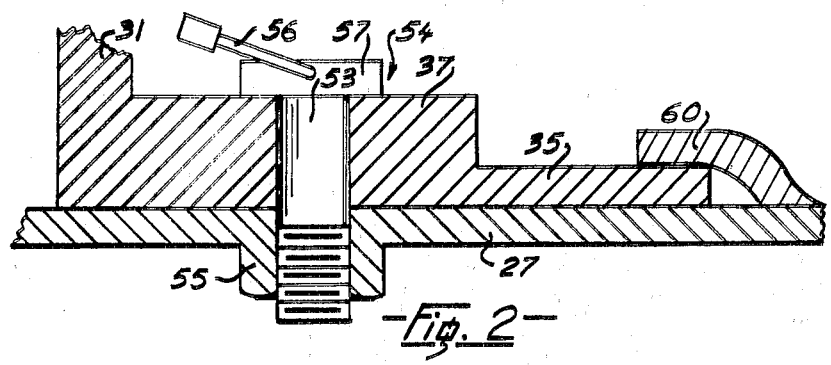
FIG. 2 is a detail section on a vertical plane through line 2—2 FIG. 1, portions of the guide being removed for clarity of illustration.
Figure 4:
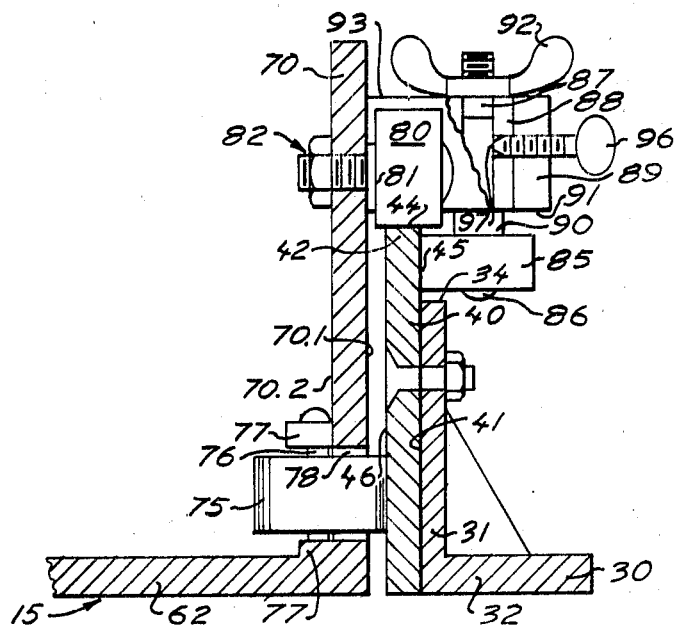
FIG. 4 is a detail section in a vertical plane through line 4—4 FIG. 1.

FIGS. 1, 2, and 4

The base frame 11 is made up of two lengths of aluminum angles 21. The angle 19 has a pair of C clamps 22 welded thereto for clamping the angle 19 against an edge 23 of the worktable 12. An edge 24 of the angle 19 constitutes a guide edge for wood stock to be cut.

The angle 21 has a hinged connection at 25 with a vertical flange 26 of the angle 19, a horizontal flange 27 of the angle 21 being spaced above the table.

The guide rail assembly 13 includes an aluminum angle 29 having a vertical flange 31 and a horizontal flange 32. A horizontally disposed semicircular index plate 35 having a central raised portion 37 extends from an edge 38 of the horizontal flange 32 between opposite ends 30.1 and 30.2 of the angle 29. The angle 29, the index plate 35 and the raised portion 37 are cast as an integral unit.

The guide rail assembly has a guide rail 40, proper, which is a length of steel stock rectangular in section, bolted to an outer face 41 of the vertical flange 31, the rail 40 having an upper portion 42 extending above an upper edge 43 of the flange 31 as to present an upper guide edge 44, a front guide face 45, and a rear guide face 46.

The adjusting foot assembly 14 includes an integral supporting block 47 adjacent the end 30.2 of the angle 30, the block extending outwards beyond the edge 38 of the horizontal flange 32. A vertical shaft 49, having a foot 50 at a lower end, slides through the block 47 being adjustably secured by a thumbscrew 51.

The guide rail assembly, see FIG. 2, is mounted for pivotal movement adjacent an end 52 of the horizontal flange 21 of angle 19 on an unthreaded shank 53 of an axis bolt 54. The bolt 54 passes through the raised portion of the index plate and is threaded at a lower end for engagement with an internally threaded socket member 55 secured to the horizontal flange 27 of the angle 21. Tightening of the axis bolt by a handle 56 secured to a head 57 of the bolt thus secures the assembly against rotative movement relative to the base frame 11.

The index plate, see FIGS. 1 and 2, has a protractor scale 59 centered on the axis bolt and a pointer 50 extending from the horizontal flange 27 of angle 21 and indicates, on the scale, the internal angle between the guide rail 40 and a guide edge 24 of the angle 20.

FIGS. 1, 3, 4, and 5

The carriage 15, see FIG. 5, is an aluminum casting having a generally rectangular baseplate 62 which has a central longitudinal axis 63 and a central transverse axis 64. The saw 16, having a foot plate 66 engageable by clamps 65, is mounted on the baseplate 62 with a saw arbor 67 extending parallel to the transverse axis 64 and with a saw blade 68, shown in broken outline, clear of an edge 69 of, an extending below, the baseplate.

Figure 3:
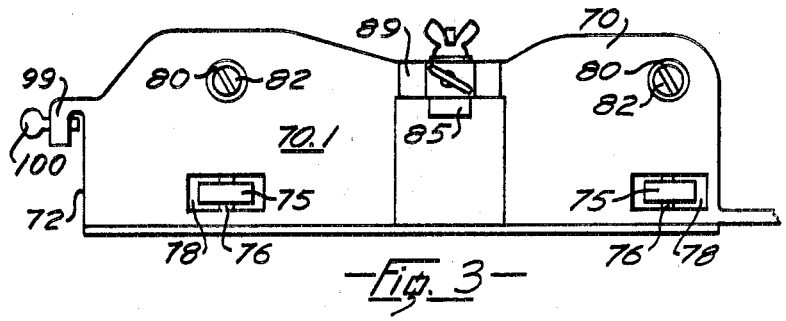
FIG. 3 is a front elevation of the saw carriage.

The carriage, see FIGS. 1, 3 and 5, has a vertical sidewall 70 extending upwards from an edge of the baseplate opposite the edge 69, the sidewall having a vertical outer face 70.1 normal to the transverse axis 64. A vertical end wall 71 joins the wall 70 and has an outer face 72 normal to the longitudinal axis 63.

A pair of lower guide rollers 75, see FIGS. 4 and 5, are mounted on vertical pins 76 extending between brackets 77 on an inner face 70.2 of the sidewall. 70, the pins being spaced apart equidistantly on opposite sides of the transverse axis 64. The rollers 75 extend outwards beyond the face 70.1 through apertures 78 and are disposed so that a tangent common to both rollers extends parallel to the longitudinal axis 63 of the carriage.

A pair of upper support rollers 80, one being shown in FIG. 4, are mounted on outer ends of horizontal shanks 81 of bolts 82 which extend transversely through the vertical sidewall 70 adjacent an upper edge thereof and are spaced apart adjacent an upper edge thereof and are spaced apart equidistantly on opposite sides of the transverse axis 64. The bolts 82 are disposed so that a tangent common to both rollers 30 extends parallel to the axis 63 of the carriage.

An adjustable guide roller 85, see FIG. 4, is mounted midway between the upper support rollers 70 on a lower end 86 of a vertical bolt 87 which has a sliding fit in a slot 88 of a supporting block 89 which extends from an upper edge of the wall 70 outwards of outer face 70.1. The slot, as seen in FIG. 5, extends parallel to the transverse axis 64 of the carriage.

The bolt 87 has a shoulder 90 bearing against an under side 91 of the support block 89 the bolt 87 being threaded at an upper end 93 to receive a wing nut 92 which can be tightened down against an upper side 94 of the support block 89. A thumbscrew 96 extends through the support block 89 in alignment with the slot which has an inner end 97 engageable with the bolt 87. The roller 85 can be adjustably positioned along the transverse axis 64 to the vertical sidewall 70.1 by loosening the wing nut, then suitably adjusting the thumbscrew to move the bolt towards or away from the face 70.1, and then tightening the wingnut 92. It is seen that the carriage makes only rolling contact with the guide rail.

FIGS. 1, 5, and 6

The vertical end wall 70 has, at an upper edge, a pair of hook members 99 which extend outwards of the face 72. The hook members are spaced apart equidistantly on opposite sides of the longitudinal axis 63 of the baseplate and have thumbscrews 100 for engaging the guide rail, see FIG. 6.

OPERATION

FIGS. 1 and 2

In setting up the saw guide for crosscutting the base frame is secured to the worktable 12, as previously described, and the carriage is positioned on the guide rail 40 as shown in FIGS. 1 and 4, i.e., with the upper rolls 80 resting on the upper guide edge 44 of the rail, the rollers 75 contacting the rear guide face 46 adjacent a lower edge and the adjusting roller 45 contacting the front guide face 45. The guide rail is adjusted above the pivot bolt to a desired angle, as read on the scale of the index plate, and is adjusted by the foot assembly 14 to be parallel to the table top. A thumbscrew 101 which extends through the horizontal flange 27 of the angle 21 is tightened into a tapped hole 102 in the angle 10 to releasably secure the angle 21 against movement and prevent tipping of the guide rail assembly 12 about the hinges 26 should the carriage be moved to a position adjacent the end 30.1 of the angle 29. The axis bolt is then tightened down against the index plate to prevent further movement of the guide rail. If required, the carriage is levelled with respect to the worktable by means of adjusting roller 45.

For ripping, the carriage is mounted on the guide rail, as shown in FIGS. 5 and 6, i.e., with the hook members 99 over the upper portion 42 of the guide rail and the latter positioned so as to extend at right angles to the guide edge 24.

The thumbscrews 100 are tightened against the guide rail when the carriage has been suitably adjusted to a position wherein the saw blade is at a required distance from the guide edge 24.

I claim:

1. A saw guide for a portable powered hand saw, the guide including:
    a. a base frame adapted to be clamped at an edge of a worktable, the frame having an upper member spaced above the table,
    b. a guide rail assembly having front and rear guide faces and an upper support edge,
    c. means for mounting the guide rail assembly on the upper member of the base frame spaced above the worktable for adjustment about a vertical axis,
    d. a saw carriage having a central longitudinal axis and a central transverse axis adapted to be mounted on the guide rail for longitudinal movement along the rail, the carriage having:
    e. a pair of upper support rollers spaced equidistantly apart on opposite sides of the carriage transverse axis for rollably engaging the upper support edge of the guide rail,
    f. a pair of lower guide rollers spaced equidistantly apart on opposite sides of the transverse axis for engaging the rear guide face of the guide rail adjacent a lower edge thereof and,
    g. an upper guide roller rotatable about a vertical axis positioned midway between the upper rollers for engaging the front guide face of the guide rail adjacent an upper edge thereof so that the carriage makes only rolling contact with the guide rail, 2. A saw guide as claimed in claim 1 including:
    h. means mounting the upper guide roller for adjustment along the transverse axis.

3. A saw guide as claimed in claim 2 in which the means (h) includes:
    i. a supporting block extending from the carriage outwards of and above the guide rail, the block having a vertical slot parallel to the transverse axis of the carriage,
    ii. a bolt extending vertical through the slot, the bolt having the adjustable roller mounted at a lower end,
    iii. a shoulder on the bolt, the shoulder being engageable with an under side of the block,
    iv. a wing nut engaged with an upper end of the bolt adapted to be tightened against an upper side of the block and,
    v. an adjusting screw extending through the block in a line with the slot, the screw having an inner end engaging the bolt.

4. A saw guide as claimed in claim 1 including:
    i. a vertical end wall of the carriage having an outer face normal to the longitudinal axis of the carriage,
    ii. A pair of hook member at an upper edge of the vertical end wall spaced apart equidistantly on opposite sides of the longitudinal axis, the hook members being adapted to slidably grip the guide rail and means carried by the hook members operable into engagement with the guide rail to secure the carriage against movement longitudinally of the guide rail.

5. A saw guide as claimed in claim 1 in which the base frame includes:
    j. a lower angle adapted to be clamped to an edge of the worktable,
    k. an upper angle having a hinged connection with the lower angle member, and
    l. means for releasably connecting the upper angle to the lower angle so as to prevent hinged movement of the upper angle.

6. A saw guide as claimed in claim 1 in which the means (c) includes:
    m. a vertical axis bolt on which the guide rail assembly is mounted for pivotal movement and a threaded socket member on the upper base frame member for threadedly receiving a threaded lower end of the pivot bolt, the bolt having a head adapted to be tightened against the guide rail assembly for securing the latter against pivotal movement.

* * * * *